(12) United States Patent
Yanaka et al.

(10) Patent No.: US 6,672,664 B2
(45) Date of Patent: Jan. 6, 2004

(54) CHILD CAR SEAT AND BELT LOCKING APPARATUS USED THEREFOR

(75) Inventors: Hidenori Yanaka, Saitama (JP); Mitsuru Washizuka, Saitama (JP)

(73) Assignee: Combi Corporation, Tokyo-To (JP)

( * ) Notice: Subject to any disclaimer, the term of this patent is extended or adjusted under 35 U.S.C. 154(b) by 0 days.

(21) Appl. No.: 09/977,402

(22) Filed: Oct. 16, 2001

(65) Prior Publication Data
US 2002/0043838 A1 Apr. 18, 2002

(30) Foreign Application Priority Data
Oct. 16, 2000 (JP) ........................................ 2000-315214

(51) Int. Cl.[7] ................................................. A47C 1/08
(52) U.S. Cl. ............................ 297/256.16; 297/250.1; 24/134 KB
(58) Field of Search ........................... 297/483, 256.16, 297/250.1; 24/68 CD, 635, 637, 191, 194, 71 SB, 71.1, 328, 134 R, 134 KA, 134 KB

(56) References Cited

U.S. PATENT DOCUMENTS

| | | | |
|---|---|---|---|
| 844,540 A | * 2/1907 | Roy et al. | 24/170 |
| 2,837,806 A | * 6/1958 | Hawie | 24/328 |
| 4,387,489 A | * 6/1983 | Dudek | 24/133 |
| 4,660,889 A | 4/1987 | Anthony et al. | |
| 5,286,086 A | * 2/1994 | Gunji | 297/232 |
| 6,152,528 A | * 11/2000 | van Montfort | 297/250.1 |

FOREIGN PATENT DOCUMENTS

| | | | | |
|---|---|---|---|---|
| DE | 197 11 812 C1 | 5/1998 | | |
| DE | 197 22 096 A1 | 12/1998 | | |
| EP | 0 560 184 A1 | 9/1993 | | |
| EP | 0 732 235 A2 | 9/1996 | | |
| EP | 0 816 161 A1 | 1/1998 | | |
| FR | 2641236 | 7/1990 | | |
| GB | 2106978 A | * 4/1983 | ........... A44B/11/06 |
| WO | WO 00/30886 | 6/2000 | | |

OTHER PUBLICATIONS

Patent Abstracts of Japan—Publication No. 0 805 8445, Publication Date Mar. 5, 1996.
Patent Abstracts of Japan—Publication No. 2001 097090, Publication Date Apr. 10, 2001.

* cited by examiner

Primary Examiner—Peter M. Cuomo
Assistant Examiner—Stephen D'Adamo
(74) Attorney, Agent, or Firm—Birch, Stewart, Kolasch & Birch, LLP

(57) ABSTRACT

A child car seat (10) has a belt insertion opening (13) having inlets at opposite side surfaces thereof to receive a seat belt (16) inserted therethrough, and has an aperture (14) opening to the front surface thereof to provide access to the belt insertion opening (13). A belt locking apparatus (20) is disposed inside the belt insertion opening (13) to be handled through the aperture (14). The belt locking apparatus (20) includes a base (21) secured inside the belt insertion opening (13), and a lock arm (22) disposed for rotation relative to the base (21) to receive the seat belt (16) therein when the lock arm (22) is opened, and to clamp the seat belt (16) between the lock arm (22) and the base (21) when the lock arm (22) is closed.

17 Claims, 16 Drawing Sheets

CHILD CAR SEAT AND BELT LOCKING APPARATUS USED THEREFOR

BACKGROUND OF THE INVENTION

1. Field of the Invention

The present invention relates to a child car seat, and more particularly, to a child car seat to be fixed on a passenger seat of a vehicle with a seat belt of the vehicle and a belt locking apparatus used therefor.

2. Description of the Related Art

As shown in FIG. 16, a child car seat 1 includes a child car seat main body (hereinafter simply called "seat body") 1a for accommodating a child in a sitting position, a support 1b for being set on a passenger seat of a vehicle to support the seat body 1a in an appropriate posture. The seat body 1a is integrally supported on the support 1b, or is supported for rotation or inclination on the support 1b.

The child car seat 1 is fixed on a passenger seat by inserting a seat belt 3 together with a tongue plate 4 through a belt insertion opening 2, bored through the support 1b, from the inlet end thereof to expose the tongue plate 4 out of the outlet end of the opening 2, then bringing the tongue plate 4 into engagement with the buckle 5 of the passenger seat, and binding the lap side section 3a and the shoulder side section 3b of the seat belt 3 with a seat belt fastening clip (hereinafter simply called "clip") 6.

The child car seat 1 having the clip 6 as a separate member involves the problem of losing the clip 6. Furthermore, upon fixing the child car seat 1 on a passenger seat, the child car seat 1 requires a user to put his/her weight on it while attaching the clip 6 on the seat belt 3 in one side of the child car seat 1, and this makes fixture of the child car seat 1 annoying.

Taking it into consideration, the applicant proposed a child car seat as shown in FIG. 17, which has an operation aperture 7 to open to the front surface of the seat body 1a and has a clip 8 undetachably held at a position within the opening 7.

This child car seat 1, because of using the undetachable clip 8, does not suffer loss of the clip 8, and it is easy to handle because the seat belt 3 can be fastened from the front side of the child car seat 1.

The child car seat 1, however, is not yet sufficiently easy to handle because it needs insertion of the seat belt 3 between comb-shaped fingers of the clip 8 from their free end side.

SUMMARY OF THE INVENTION

It is therefore an object of the present invention to provide a child car seat facilitating attachment of a seat belt thereto, and a belt locking apparatus used therefor.

According to the present invention, there is provided a child car seat to be fixed on a passenger seat of a vehicle with a seat belt of the vehicle, including: a support being set on the passenger seat of the vehicle; a seat body supported on the support; and a belt locking apparatus that clamps the seat belt of the vehicle to fix the support on the passenger seat of the vehicle, the belt locking apparatus including a base, and a lock mechanism receiving the seat belt therein when it is opened relative to the base and to clamp the seat belt when it is closed relative to the base.

The child car seat according to the present invention can be handled very easily upon attaching a seat belt by simply opening the locking mechanism, then putting the seat belt therein, and next closing the lock mechanism.

In a first embodiment of the child car seat according to the present invention, the lock mechanism preferably includes a lock arm disposed for rotation relative to the base to tightly clamp the seat belt between the base and the lock arm when the lock arm is closed relative to the base, thereby preventing a movement of the seat belt in the lengthwise direction thereof.

According to the first embodiment of the present invention, since the seat belt is clamped by rotating the lock arm to its opened position, then putting the seat belt thereon, and thereafter rotating the lock arm back to its closed position, the seat belt can be attached very easily.

In the child car seat according to the first embodiment of the present invention, the belt locking apparatus preferably includes a cam, as well, which is disposed on one of the lock arm and the base for rotation in one direction to prevent a releasing movement of the seat belt while permitting a fastening movement of the seat belt when the lock arm is closed relative to the base.

In this case, since the seat belt can be additionally fastened in the closed lock arm, the child car seat can be fixed on the passenger seat more firmly.

Still in the child car seat according to the first embodiment, the cam preferably has a cam surface including depressions or projections which increase the frictional resistance to the seat belt.

In this case, if the seat belt is going to move in the releasing direction, the contact force between the seat belt and the cam increases, and functions to reliably lock the seat belt.

Yet in the child car seat according to the first embodiment, the belt locking apparatus preferably includes a ridge formed on one of the lock arm and the base to project near the cam within an area for receiving the seat belt when the lock arm is closed.

In this case, the seat belt is tightly pressed into engagement with the cam surface by a ridge, and therefore, its contact area with the cam surface increases.

In the second embodiment of the child car seat according to the present invention, the lock mechanism may include at least two clasping members aligned in parallel for opening and closing motions relative to the base, the base including an elongated terrace portion oriented across the seat belt, the clasping members being located on a tongue plate side portion and a lap belt fixture side portion, respectively, of the seat belt with respect to the terrace portion within the area for receiving the seat belt, each of the clasping members being opened to receive the seat belt on the terrace portion of the base and then being closed to clamp the seat belt between each of the clasping members and the terrace portion of the base, thereby preventing a movement of the seat belt in the lengthwise direction thereof.

According to the second embodiment of the present invention, since the seat belt is clamped by rotating the clasping members to their opened positions, then putting the seat belt thereon, and thereafter rotating the clasping members back to their closed positions, the seat belt can be attached very easily.

In the third embodiment of the child car seat according to the present invention, the lock mechanism may include a lever connected to the base for rotation, a first clasping member fixed on the base, a second clasping member on the base for movements toward and apart from the first clasping member, and a third clasping member disposed on the lever, the clasping members being substantially aligned in parallel to each other, the clasping members under engagement with the seat belt inserted in a weaving fashion being operative when the lever is manipulated such that the third clasping member moves closely to the second clasping member and urges the second clasping member closely to the first clasping member via the seat belt, which results in reducing spaces among respective said clasping members to firmly hold the seat belt between respective said clasping members to prevent a movement of the seat belt in the lengthwise direction thereof.

According to the third embodiment of the present invention, since a large distance is made between the clasping members, the seat belt can be attached or set easily, and nevertheless, the seat belt can be clamped very easily by simply moving the lever.

In the present invention, the belt locking apparatus is preferably disposed in an insertion opening for permitting the seat belt to pass through, and the base of the belt locking apparatus is preferably fixed in the insertion opening.

BRIEF DESCRIPTION OF THE DRAWINGS

FIGS. 11A, 11B and 11C show the function of the belt locking apparatus according to the second embodiment of the present invention, in which FIG. 11A shows its initial configuration, FIG. 11B shows a process of tightening the seat belt; and FIG. 11C shows a locked configuration of the seat belt;

FIGS. 14A and 14B show the function of the belt locking apparatus according to the third embodiment of the present invention, in which FIG. 14A shows its initial configuration and FIG. 14B shows the locked configuration of the seat belt;

DETAILED DESCRIPTION OF THE PREFERRED EMBODIMENTS

Some embodiments of the present invention will now be explained below with reference to the drawings.

FIGS. 1 through 8 show the first embodiment of the child car seat according to the present invention.

Figure 1:
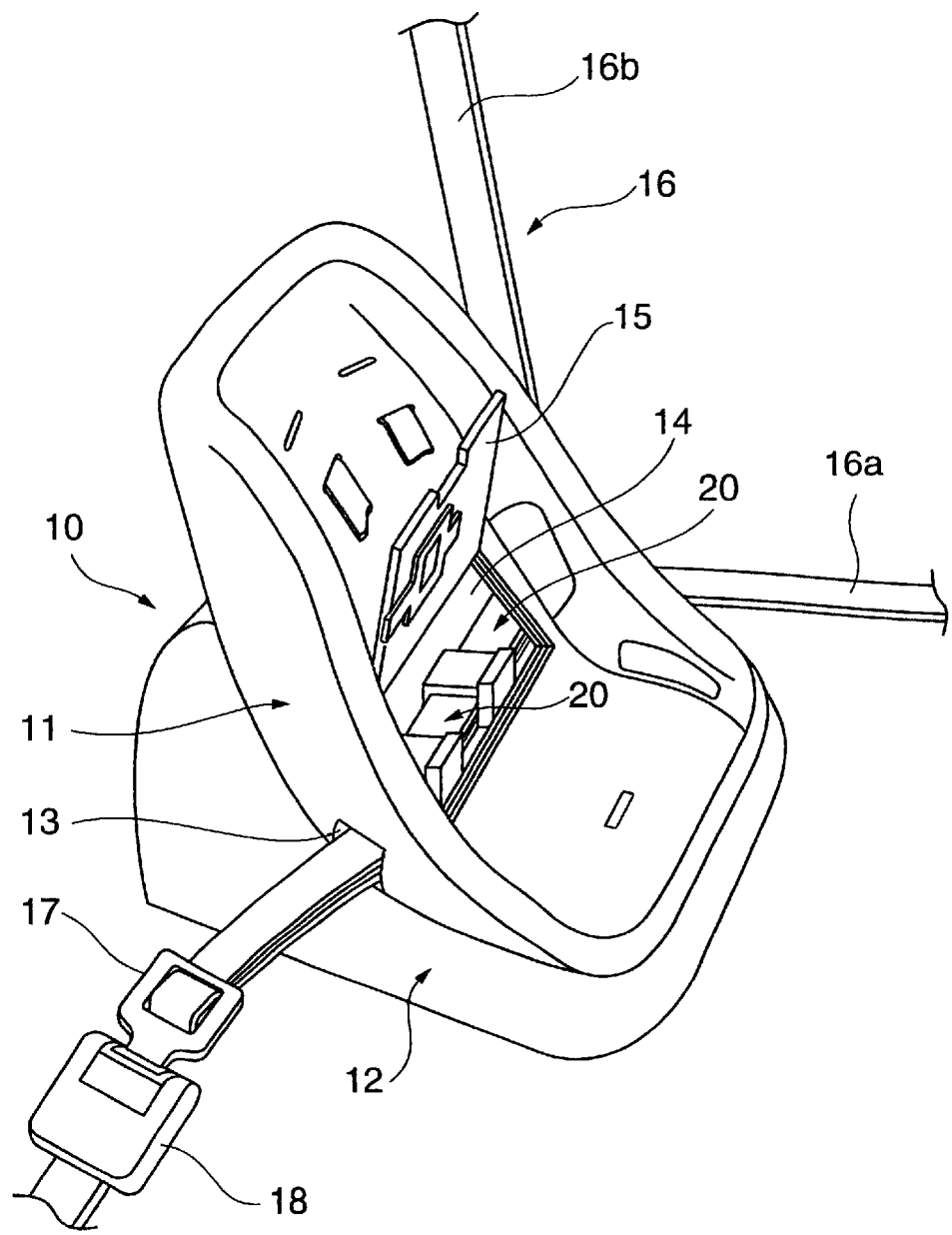
FIG. 1 is a schematic perspective view that shows the first embodiment of the child car seat according to the present invention.

As shown in FIG. 1, the child car seat 10 includes a child car seat main body (hereinagter simply called "seat body") 11 for accommodating a child in a sitting position, and a support 12 being set on a passenger seat of a vehicle to support the seat body 11 in an appropriate posture. The seat body 11 is integrally supported on the support 12, or is supported for rotation and inclination on the support 12.

Between the seat body 11 and the support 12, a belt insertion opening 13 is defined, having insertion openings at opposite sides of the child car seat 10. The seat body 11 has formed an operation aperture 14 in a central portion of the front surface of the seat body 11 to permit access to a part of the belt insertion opening 13, and a cover 15 is supported by a hinge, for example, to open and close the aperture 14.

A belt locking apparatus 20 is provided in the belt insertion opening 13 to be handled from the front space of the child car seat 10 when the cover 15 is opened.

The child car seat 10 according to the instant embodiment, as shown in FIG. 1, includes two belt locking apparatus 20 to work with any of two seat belts 16 affixed at opposite sides of a vehicle.

Figure 2:
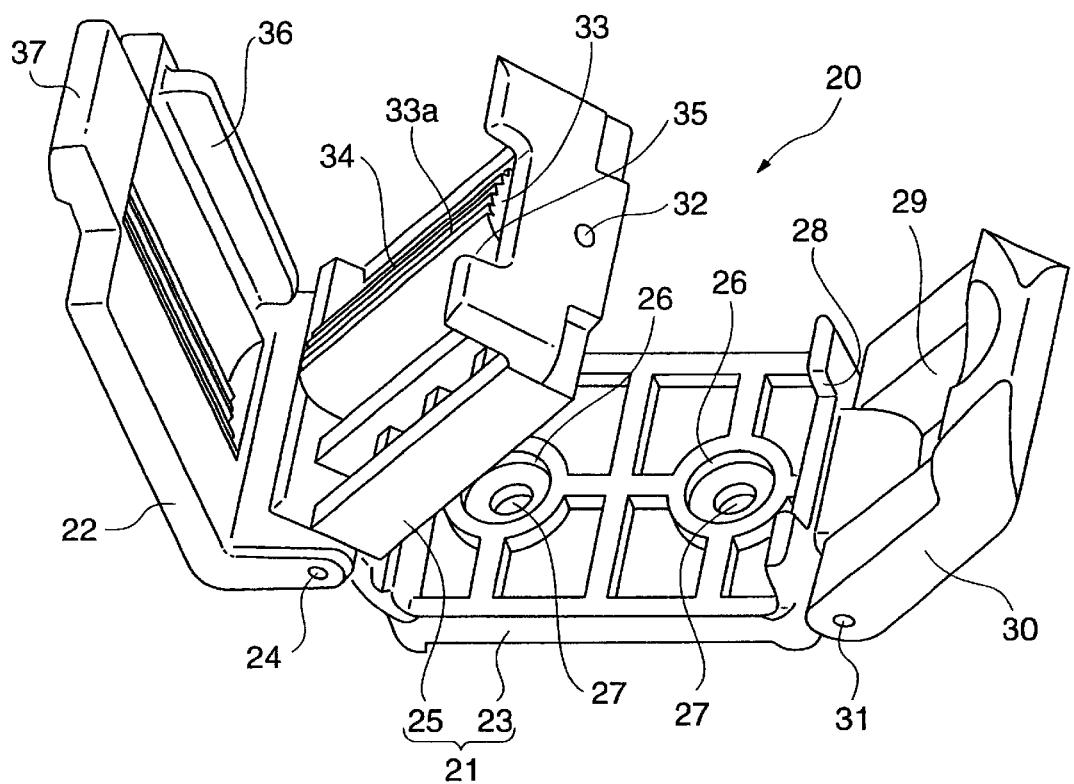
FIG. 2 is a perspective view that shows a belt locking apparatus, which is an essential part of the child car seat shown in FIG. 1, in its opened position.

The belt locking apparatus 20 shown in FIG. 2 includes a base 21 and a lock arm (lock mechanism) 22, and can clamp the seat belt 16 to fix the support 12 on a passenger seat of a vehicle. The base 21 includes a base body 23 to be fixed on the support 12 and a plate-like intermediate member 25 pivotally supported by a pin 24 at one end of the base body 23. The lock arm 22 is pivotally supported by the pin 24 at one end of the base body 23.

The base body 23 has two depressions 26 each having a screw through hole 27. The base body 23 has an indentation 28 formed at the other end. The other end of the base body 23 supports a latch member 30 pivotally supported there by a pin 31.

A cam 33 is rotatably supported by a pin 32 on the intermediate member 25. The cam 33 has a cam surface 33a that gradually increases in radius from the rotation axis of the cam 33 in one circumferential direction (in the clockwise direction in case of FIG. 4), and the cam surface 33a has depressions or projections, such as dents 34. The cam 33 is disposed to locate the cam surface 33a above the top end of the intermediate member 25. The intermediate member 25 has an indentation 35 at an upper portion of its free end.

The lock arm 22 has formed a ridge 36 extending in its width direction and a claw 37 for engagement with an engagement hole 29 of the latch member 30.

The belt locking apparatus 20 is fixed to the support 12 with screws (not shown) applied through the base body 23.

Then, the lap belt section 16a is placed on the top surface of the base body 23, the intermediate member 25 is next reclined onto the lap belt section 16a, the shoulder belt section 16b is next placed on the intermediate member 25, and the lock arm 22 is reclined thereon. As a result, the intermediate member 25 is positioned in place on the base body 23 by engaging the free end of the intermediate member 25 with the indentation 28 of the base body 23. Also, the lock arm 22 is positioned in place on the intermediate member 25 by engaging the claw 37 of the lock arm 22 with the indentation 35 of the intermediate member 25.

Figure 3:
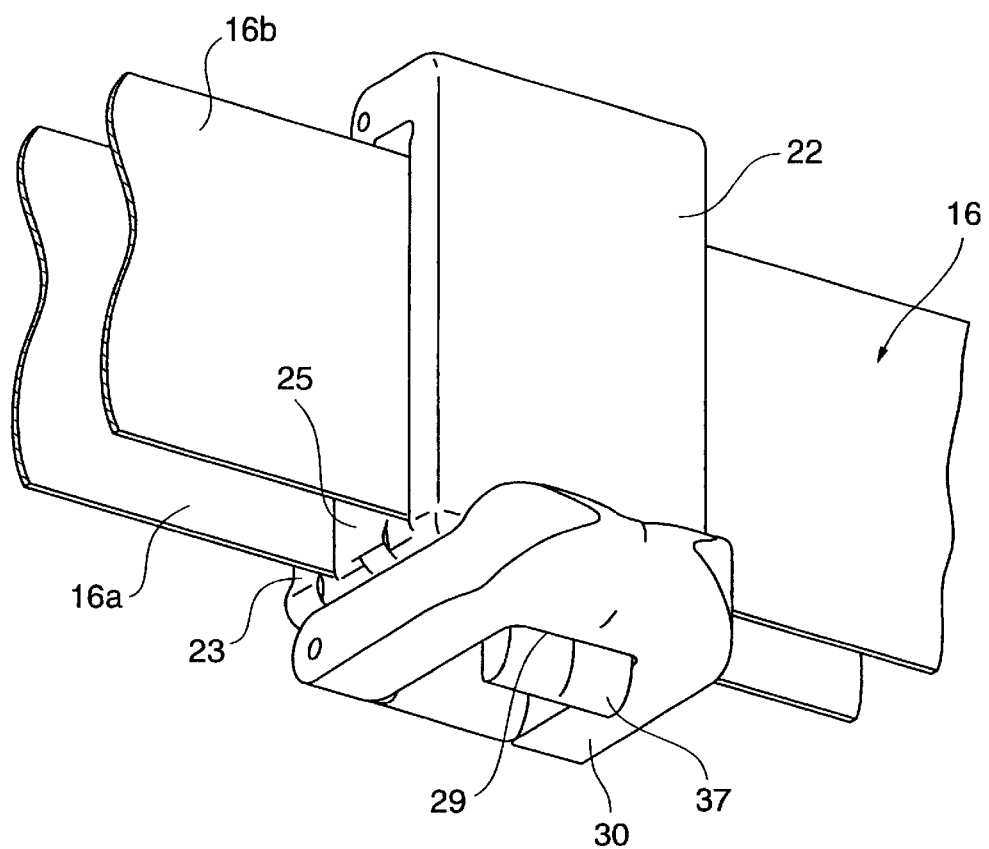
FIG. 3 is a perspective view of the belt locking apparatus shown in FIG. 2 in its closed position.

Then, the latch member 30 is rotated to bring the engagement hole 29 into engagement with the claw 37 of the lock arm 22 as shown in FIG. 3. As result, the lap belt section 16a is held between the base body 23 and the intermediate member 25, and the shoulder belt section 16b is held between the intermediate member 25 and the lock arm 22.

In this manner, the lap belt section 16a held between the base body 23 and the intermediate member 25 is regulated in its width direction by the base body 23 and the intermediate member 25 but freely movable in its lengthwise direction.

The shoulder belt section 16b held between the intermediate member 25 and the lock arm 22 is regulated in its width direction by the intermediate member 25 and the lock arm 22 but movable in its lengthwise direction. The shoulder belt section 16b, however, is pushed toward the cam surface 33a (dents 34) by the ridge 36, and held in light contact with the cam surface 33a.

Figure 4:
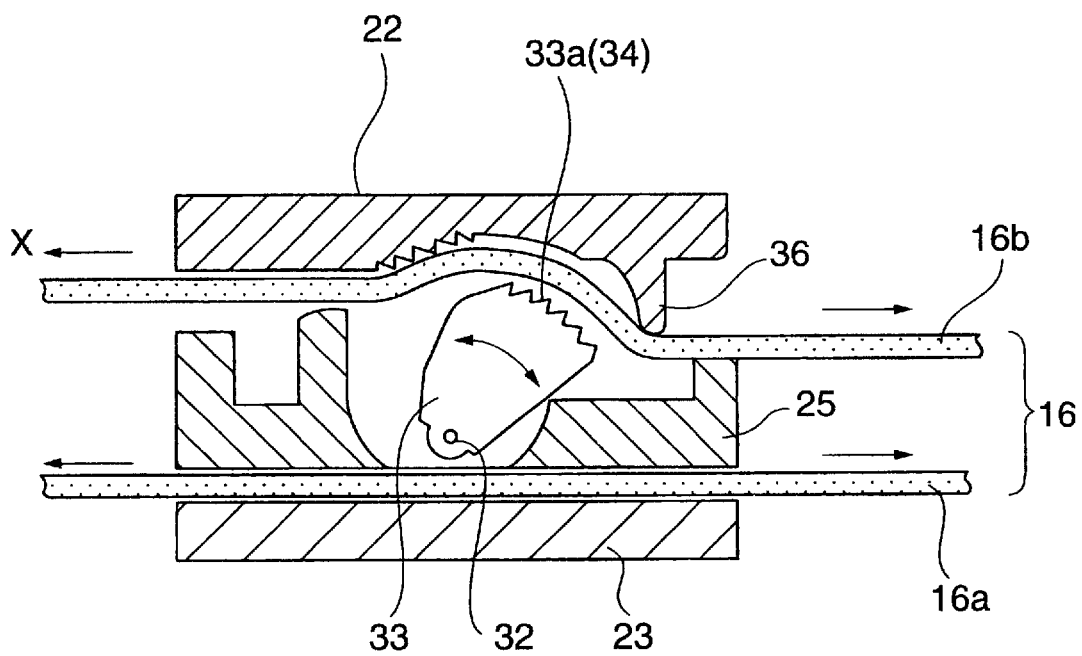
FIG. 4 is a schematic cross-sectional view that shows the function of the belt locking apparatus according to the first embodiment of the present invention.

Under that condition, if the shoulder belt section 16b is pulled in the retractor direction (right in FIG. 4), then the cam 33 is rotated in the clockwise direction in FIG. 4, and the space between the cam surface 33a and the lock arm 22 (the space for accommodating the shoulder belt section 16b) increases. In this case, therefore, the shoulder belt section 16b moves in the retractor direction.

In contrast, if the shoulder belt section 16b is pulled toward the tongue plate 17 (left in FIG. 4), then the cam 33 rotates in the counterclockwise direction in FIG. 4, and the space between the cam surface 22a and the lock arm 22 (the space for accommodating the shoulder belt section 16b) decreases. In this case, therefore, the shoulder section 16b is tightly clamped between the cam surface 33a and the lock arm 22 and prevented from movement.

That is, the belt locking apparatus 20 permits the lap belt section 16a to freely move in the right and left directions but restrict movements of the shoulder section 16b only to the right in FIG. 4 (in the retractor direction). Therefore, under the condition where the lock arm 22 is in engagement with the engagement hole 29 of the latch member 30 (FIG. 3), when the shoulder belt section 16b is pulled to the right in FIG. 4, the shoulder belt section 16b moves to the right, and through the tongue plate 17, it pulls the lap belt section 16b to the left to tighten it.

When a force toward loosening or releasing the lap belt section 16a, i.e., a force pulling the lap belt section 16a to the right is applied, it results in pulling the shoulder belt section 16b to the left through the tongue plate 17. However, since the shoulder belt section 16b is prevented from movement by the belt locking apparatus 20, the lap belt section 16a is not loosened.

The belt locking apparatus 20 explained above is designed to fix the child car seat 10 on a passenger seat by using a seat belt affixed at the left side of the vehicle.

In the embodiment explained above, two belt locking apparatuses 20 are provided in the belt insertion opening 13 of the child car seat 10 (see FIG. 1). The belt locking apparatus 20 explained heretofore is disposed on the right side of the child car seat 10 (left side when the child car seat 10 is viewed from its front face). The other belt locking apparatus 20 disposed on the left (right when the child car seat 10 is viewed from its front face) is used in combination of a seat belt affixed at the right side of the vehicle.

In the belt locking apparatus 20 disposed on the left, the cam surface 33a of the cam 33 is symmetrically of that of the belt locking apparatus on the right with respect to the center of the belt insertion opening, and the position of the ridge 36 formed on the lock arm 22 is also symmetrical of the ridge 36 of the belt locking apparatus 20 used for fixture in the right as explained above.

The child car seat 10 having the above-explained configuration is installed on a passenger seat with a seat belt 16 affixed at the left side of the vehicle in the following manner.

Figure 5:
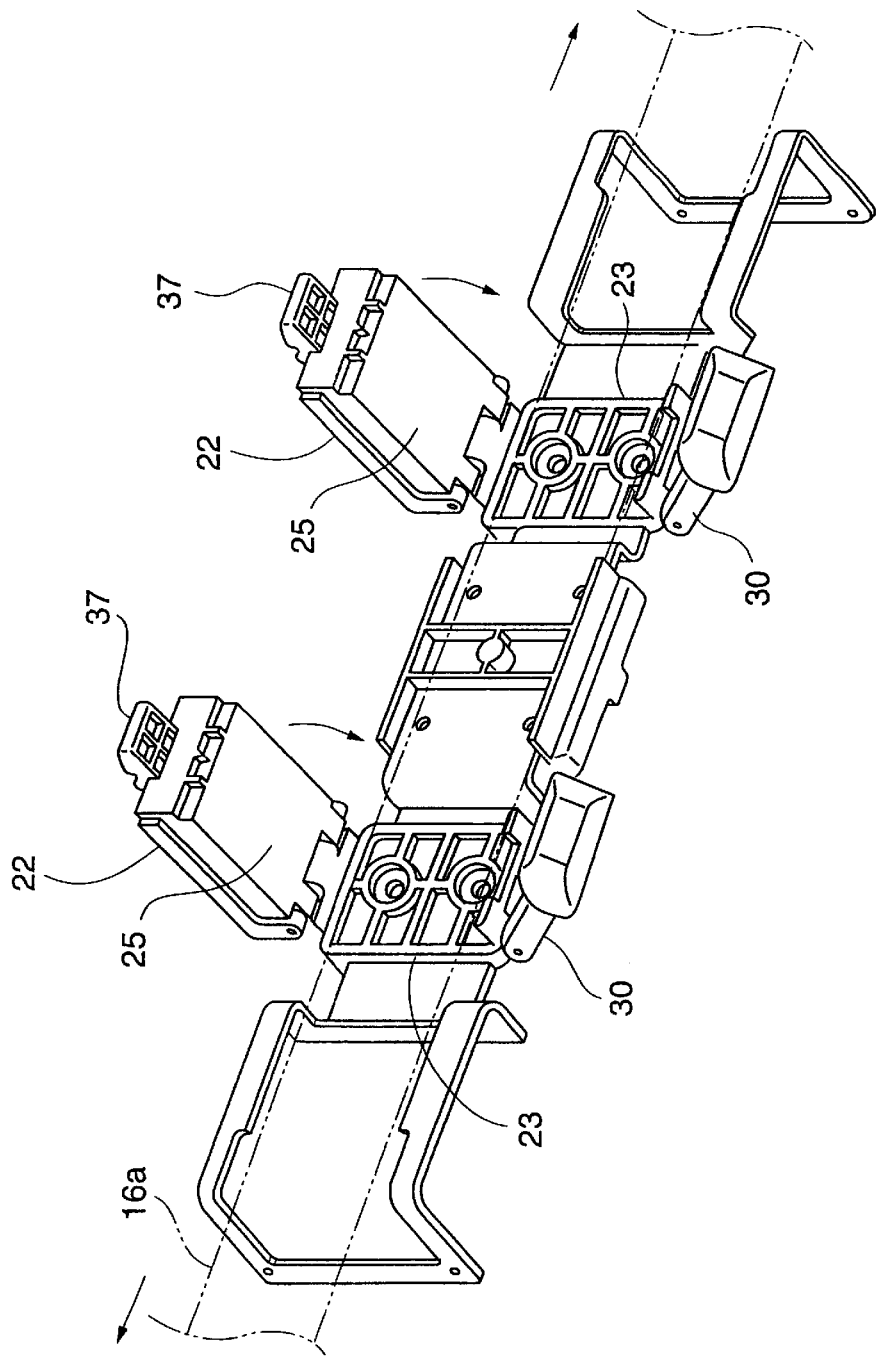
FIG. 5 shows a procedure of attaching a seat belt in the belt locking apparatus according to the first embodiment of the present invention, in a perspective view that shows how the lap belt section is attached.

First as shown in FIG. 5, maintaining the lock arms 22 and the intermediate members 25 of the right and left belt locking apparatus open upward, the tongue plate 17 of the seat belt 16 is inserted in the belt insertion opening 13 as shown in FIG. 1, and it is brought into engagement with the buckle 18 of the passenger seat.

Figure 6:
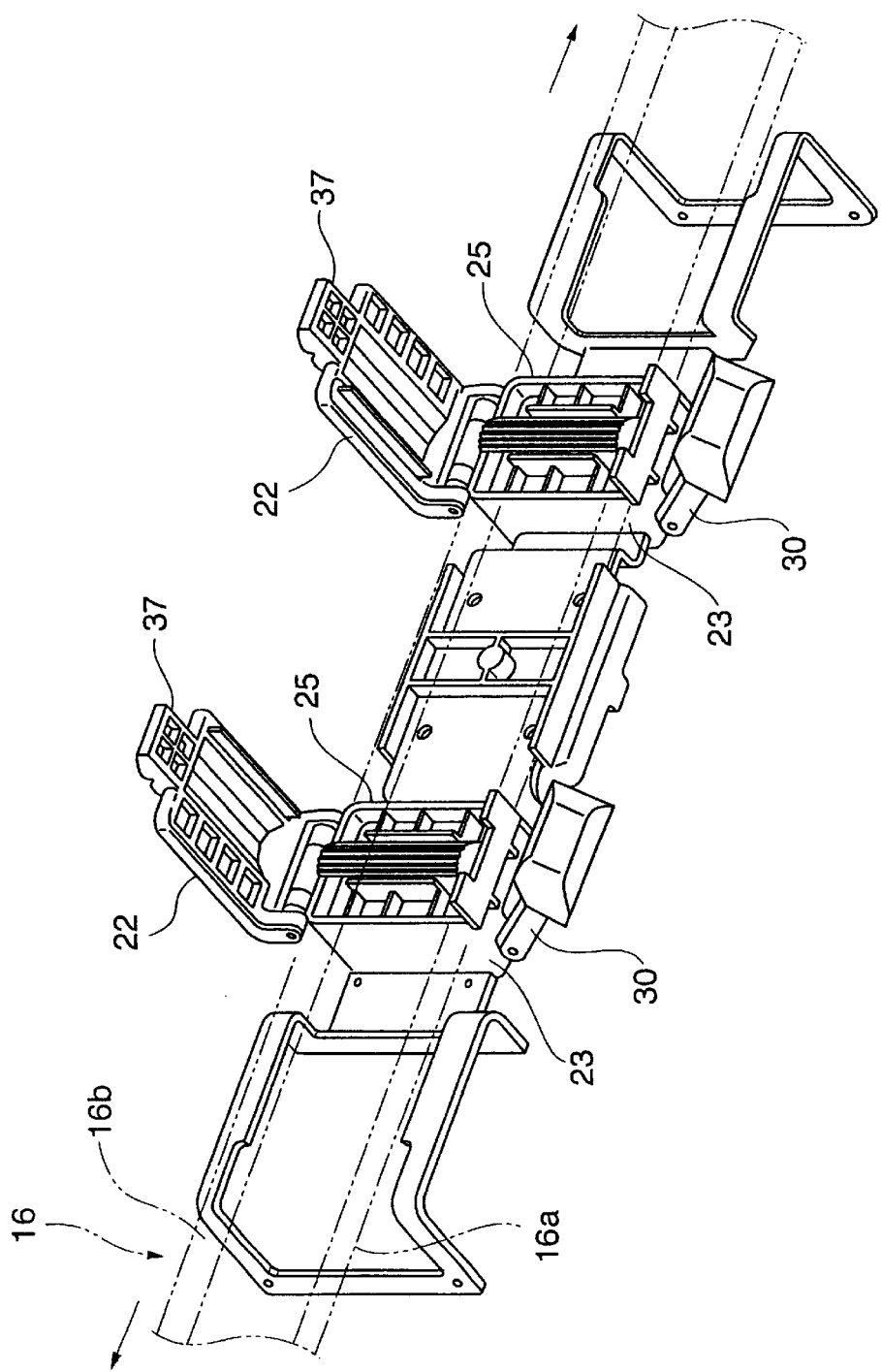
FIG. 6 shows a procedure of attaching a seat belt in the belt locking apparatus according to the first embodiment of the present invention, in a perspective view that shows how the shoulder belt section is attached.

At the same time, or later, the lap belt section 16a of the seat belt 16 is put on the top surfaces of the base bodies 23. Then, as shown in FIG. 6, the intermediate members 25 are closed onto the lap belt section 16a.

Figure 7:
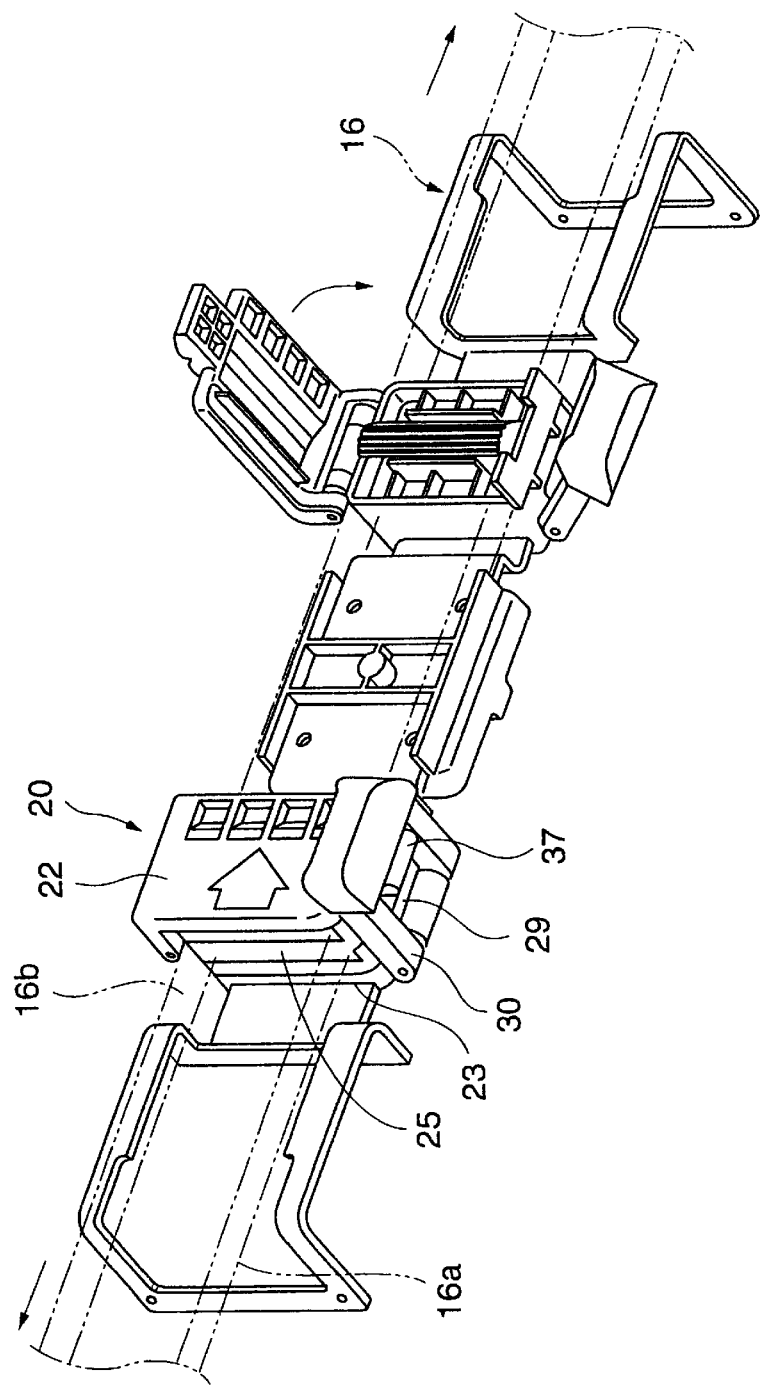
FIG. 7 shows a procedure of attaching a seat belt in the belt locking apparatus according to the first embodiment of the present invention, in a perspective view that shows an aspect after tightening the seat belt.

Subsequently, as shown in FIG. 7, the lock arm 22 of the left-hand belt locking apparatus in the drawing is closed to bring the claw 37 of the lock arm 22 into engagement with the engagement hole 29 of the latch member 30, thereby latching the lock arm 22 to the base body 23.

After that, the retractor-side portion of the shoulder belt section 16b is pulled with respect to the left-hand belt locking apparatus 20 to tense the portion of the shoulder belt section 16b nearer to the tongue plate 17 in the belt locking apparatus 20.

Figure 8:
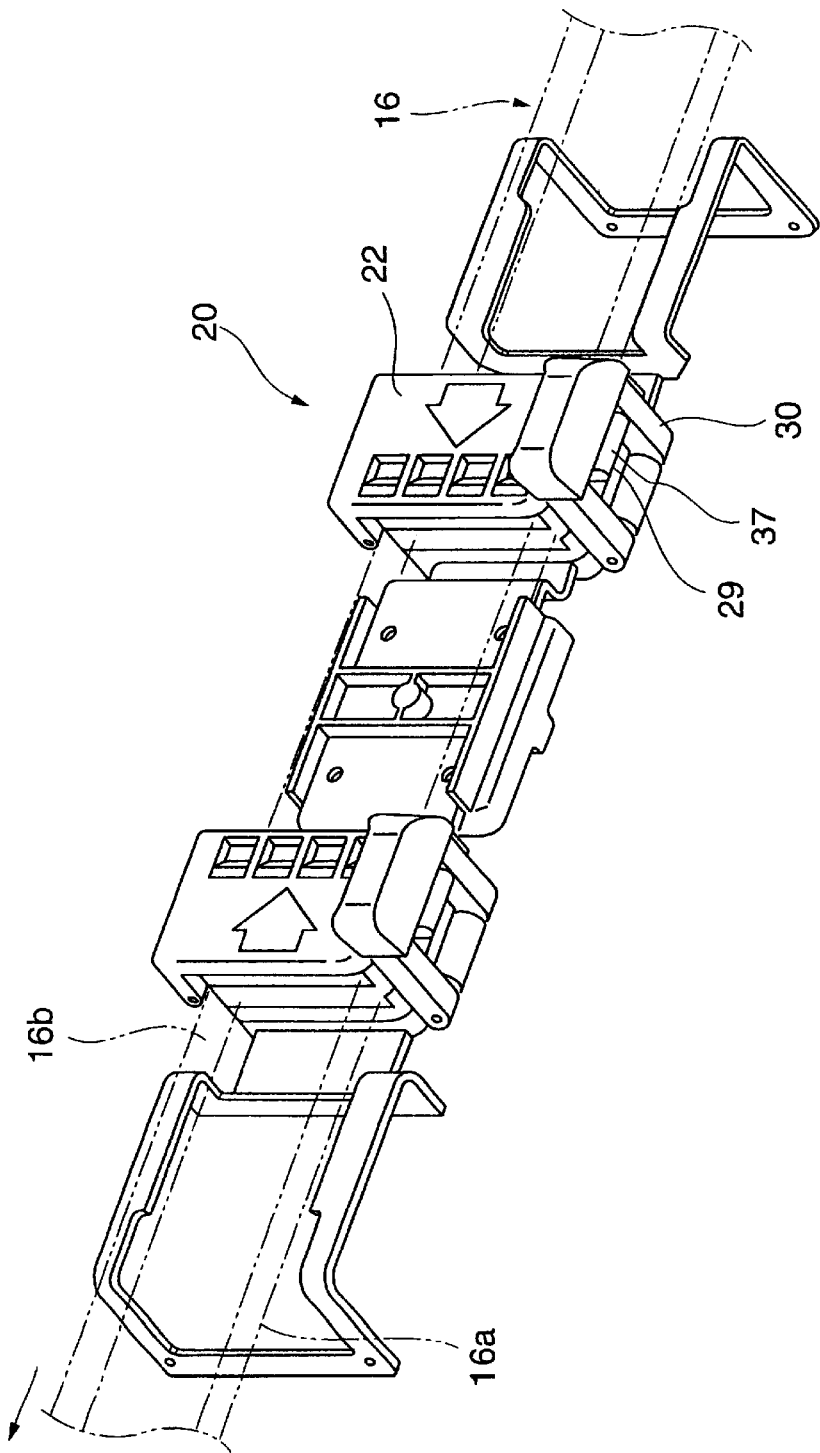
FIG. 8 shows a procedure of attaching a seat belt in the belt locking apparatus according to the first embodiment of the present invention, in a perspective view that shows an aspect after completing attachment of the seat belt.

After the seat belt 16 is tensed in this manner, the lock arm 22 of the right-hand belt locking apparatus 20 is closed as shown in FIG. 8 to bring the claw 37 of the lock arm 22 into engagement with the engagement hole 29 of the latch member 30, thereby latching the lock arm 22 to the base body 23.

In the above-explained embodiment, the intermediate member 25 is disposed for opening and closing motions relative to the base body 23, and the lock arm 22 is disposed for opening and closing motions relative to the base body 23 so as to hold the lap belt section 16a between the base body 23 and the intermediate member 25 and hold the shoulder belt section 16b between the intermediate member 25 and the lock arm 22. However, the lap belt section 16a need not engage with the belt locking apparatus 20.

FIGS. 9 through 12 show the second embodiment of the belt locking apparatus according to the present invention. The belt locking apparatus 40 is basically characterized in using a clip having three fingers of which two fingers at opposite ends are rotatable, thereby facilitating attachment of the seat belt 16.

The belt locking apparatus 40 shown here includes a base 41 fixed to the support 12 of the child car seat 10, two clasping members 42 and 43 supported for rotation on the base 41, a hold plate 44 for holding the clasping members 42 and 43 in predetermined positions, and a pin support frame 45 for supporting the clasping members 42 and 43 for free rotation. The clasping members 42 and 43, the hold plate 44 and the pin support frame 45 make up a lock mechanism.

The base 41 has a terrace portion 46 extending in a direction to come across the seat belt 16, projections 47 and 48 near one end thereof with an appropriate distance from the terrace portion 46, and a pin insertion hole 49 formed at one end portion of the terrace portion 46.

The clasping members 42 and 43 have pin insertion holes 50 and 51 formed at their corresponding end portions, and claws 52 and 53 formed at their other ends.

The hold plate 44 is made of a leaf spring having two standing tongues 54 and 55. The tongues 54 and 55 have engagement holes 56 and 57 formed at their distal ends for engagement with the claws 52 and 53 of the respective clasping members 42 and 43.

The pin support frame 45 has bearing portions 58 and 59 standing from opposite sides thereof, and these bearing portions 58 and 59 have pin insertion holes 60 and 61.

Figure 10:
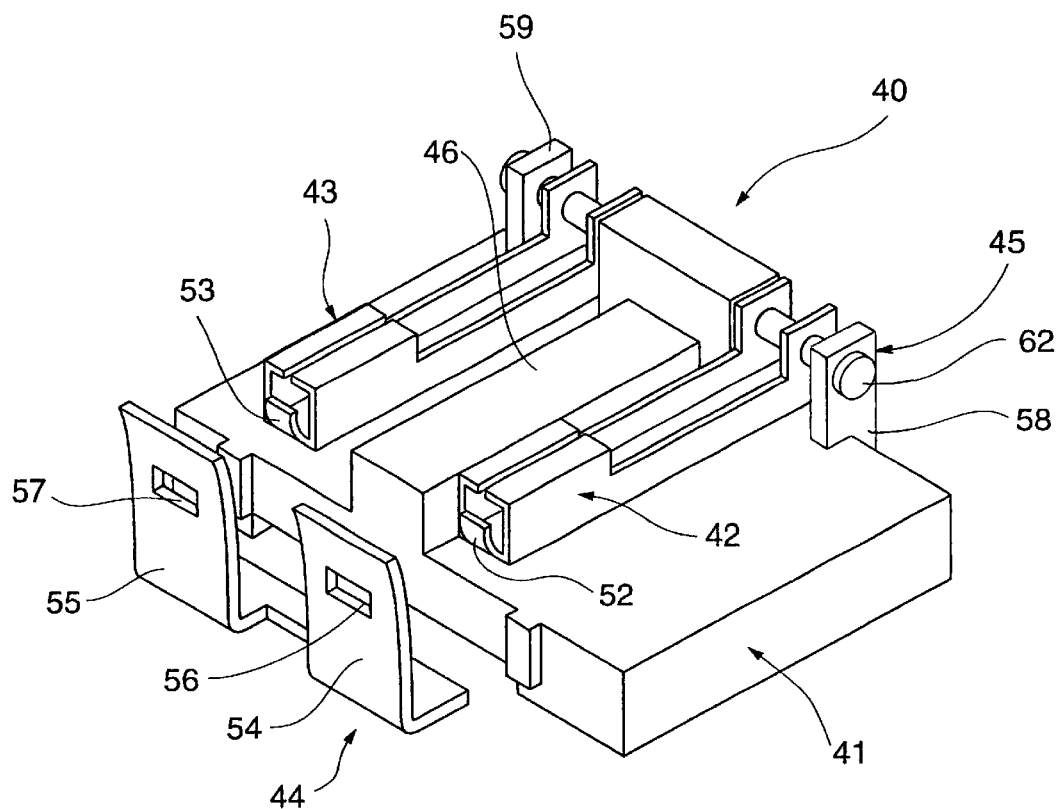
FIG. 10 is a perspective view of an essential part of the belt locking apparatus, assembled, according to the second embodiment of the present invention.

The pin support frame 45 is fixed on the base 41 with a screw, or the like, at a position locating the pin insertion holes 60 and 61 in coaxial alignment with the pin insertion hole 49. Then, the clasping members 42 and 43 are placed between the terrace portion 46 and the projections 47 and 48, and a pin 62 is successively inserted in the pin insertion hole 60 of the pin support frame 45, the hole 50 of the clasping member 42, the pin insertion hole 49 of the terrace portion 46, the pin insertion hole 51 of the clasping member 43 and the other pin insertion hole 61 of the pin support frame 45. Thereafter, a C ring 63 is applied at the tip of the pin 62. As a result, the mechanism is assembled as shown in FIG. 10.

Additionally, the hold plate 44 is also fixed on the front face of the base 41 with screws, for example.

Figure 9:
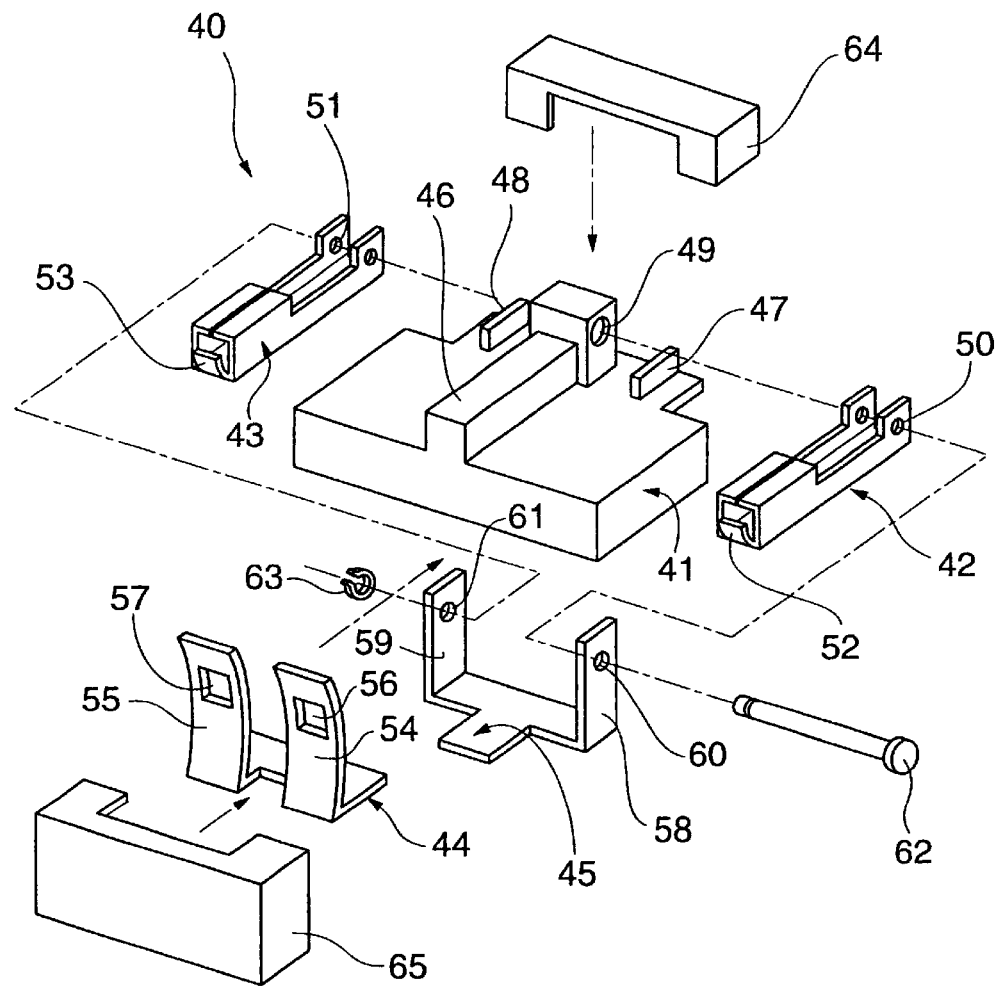
FIG. 9 is a schematic exploded perspective view that shows a belt locking apparatus according to the second embodiment of the present invention.

In FIG. 9, reference numerals 64 and 65 denote covers. The cover 64 is fixed on the base 41 to cover the pin 62. The cover 65 is fixed on the base 41 to cover the hold plate 44.

The belt locking apparatus 40 assembled in this manner is placed in the belt insertion opening 13 of the child car seat 10 similarly to the belt locking apparatus 20 already explained.

Figure 11A:
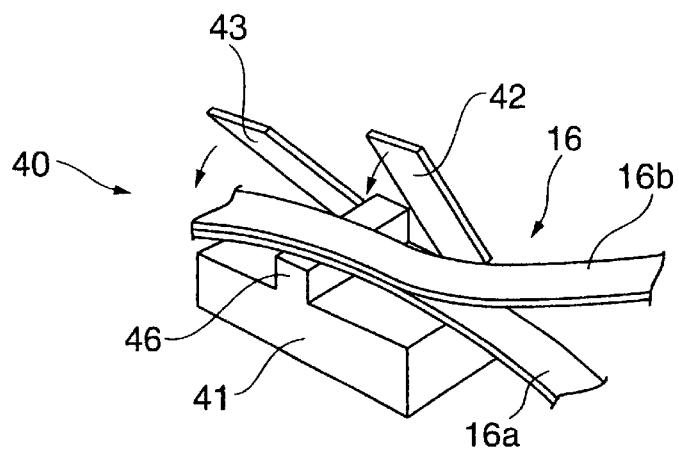
Figure 11B:
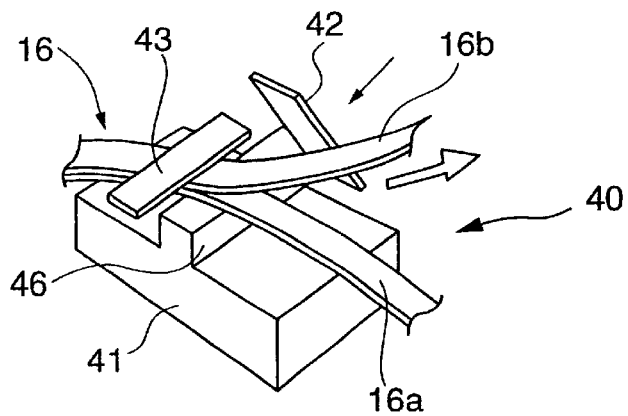

The belt locking apparatus 40, as shown in FIG. 11A, maintaining the clasping members 42 and 43 open, the lap belt section 16a and the shoulder belt section 16b of the seat belt 16 are stacked and put altogether on the terrace portion 46 of the base 41, then the clasping member 43 is closed as shown in FIG. 11B to bring the claw 53 (see FIG. 10) of the clasping member 43 into engagement with the engagement hole 57 of the hold plate 44. Maintaining this condition, the retractor side of the shoulder belt section 16b is pulled to tense the portion of the shoulder belt section 16b nearer to the tongue plate 17 and the lap belt section 16a.

Figure 11C:
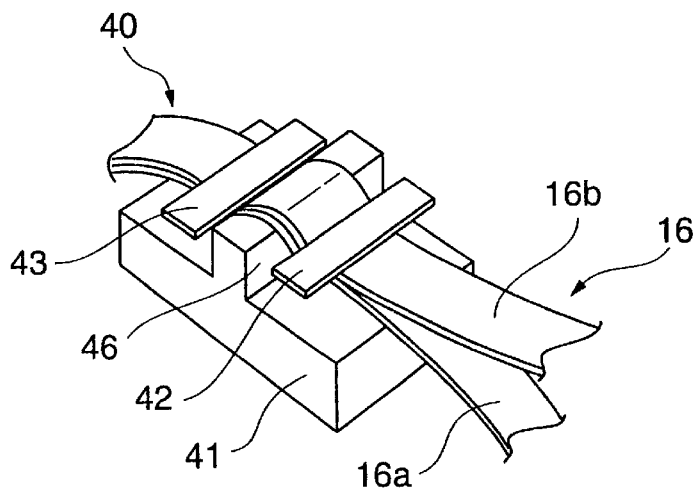
Figure 12:
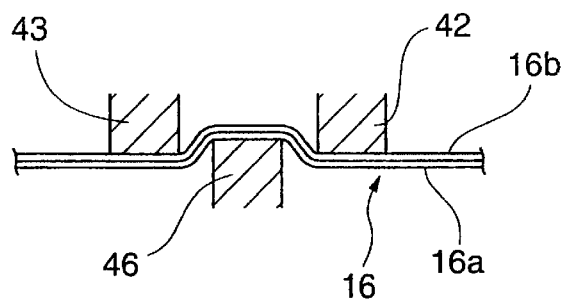
FIG. 12 is a schematic cross-sectional view that shows the seat belt locking function of the belt locking apparatus according to the second embodiment of the present invention.

Subsequently, as shown in FIG. 11C, the clasping member 42 is closed to bring the claw 52 (see FIG. 10) thereof into contact with the engagement hole 56 of the hold plate 44.

As a result, the lap belt section 16a and the shoulder belt section 16b are tightened by the clasping member 42, the terrace portion 46 of the base 41 and the clasping member 43, and the seat belt 16 is locked from movements in the lengthwise direction.

Figure 13:
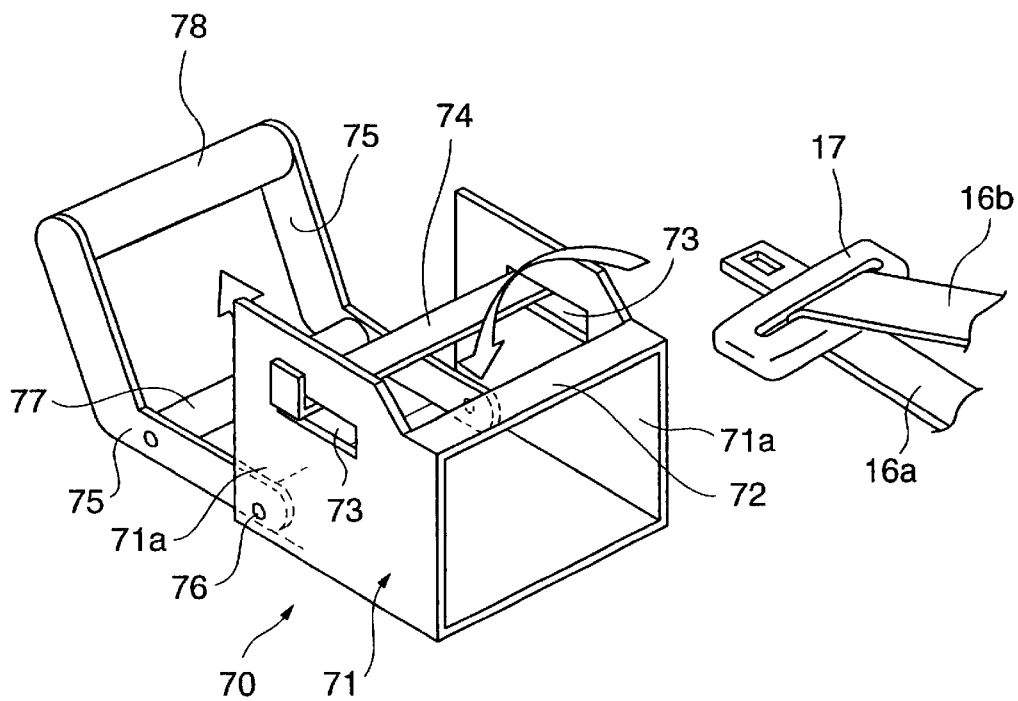
FIG. 13 is a schematic perspective view that shows a belt locking apparatus according to the third embodiment of the present invention.
Figure 14A:
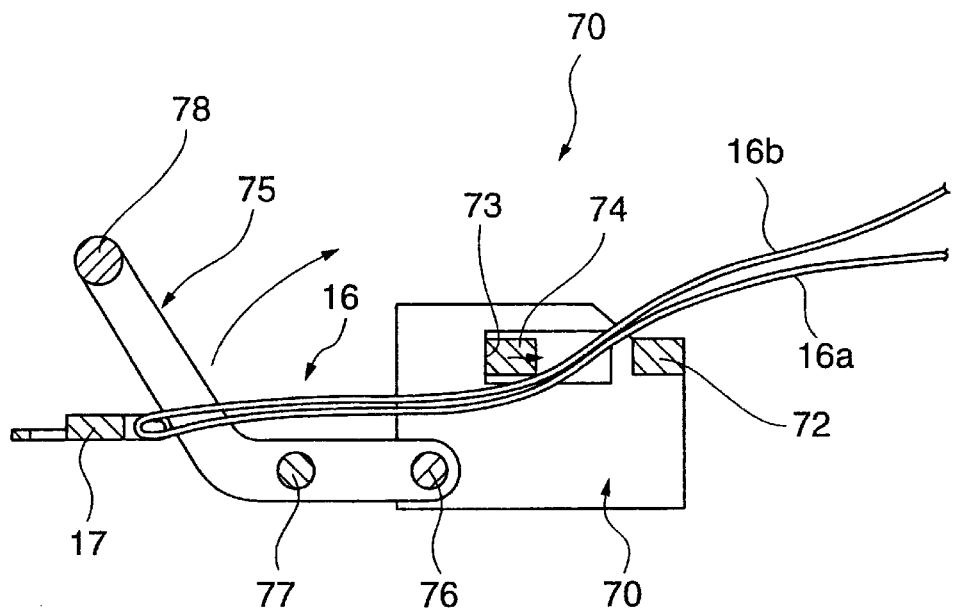
Figure 14B:
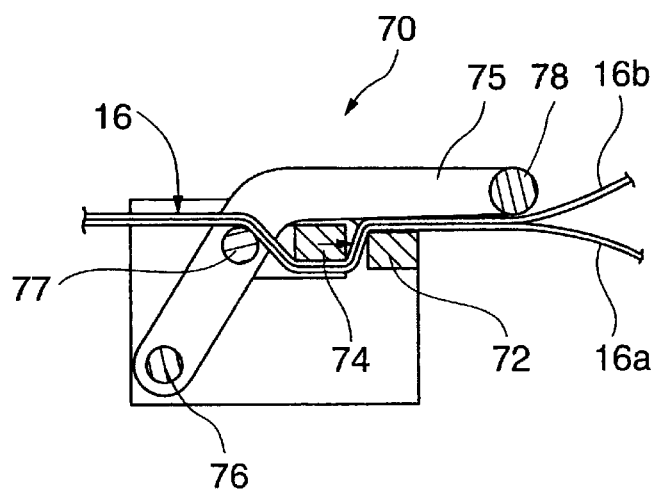

FIGS. 13, 14A and 14B show the third embodiment of the belt locking apparatus according to the present invention. The belt locking apparatus 70 shown here is configured to tighten the lap belt section 16a and the shoulder belt section 16b altogether in a stacked condition with three clasping members, similarly to the belt locking apparatus 40 already explained.

The belt locking apparatus 70 includes a box-shaped frame (base) 71 to be fixed on the support 12 of the child car seat 10. The frame 71 has vertical walls 71a and 71a standing from opposite ends thereof, and a clasping member 72 bridges the tops of the vertical walls 71a and 71a. The vertical walls 71a and 71a of the frame 71 have formed elongated slits 73 and 73, and a clasping member 74 is inserted through the elongated slits 73 and 73 for movements therein.

At lower portions of the vertical walls 71 and 71 of the frame 71, proximal ends of levers 75 and 75 are pivotally supported by pins 76. A columnar clasping member 77 securely bridges mid points of the levers 75 and 75, and a handle 78 bridges the distal ends of the levers 75 and 75. The levers 75 and 75 and the clasping members 72, 74 and 77 make up a lock mechanism.

With the belt locking apparatus 70 having the above-explained configuration, as shown in FIG. 14A, the tongue plate 17 of the seat belt 16 is inserted through between the clasping members 72 and 74, and thereafter inserted through between the clasping member 77 and the handle 78 of the levers 75. In the belt locking apparatus 70 in this status, since the clasping member 74 lies in the leftward shifted position in FIG. 14A, the space between the clasping members 72 and 74 is large. Therefore, the tongue plate 17 can be readily inserted between the clasping members 72 and 74. In addition, since the levers 75 lie in the leftward rotated position in FIG. 14A, the space between the clasping members 77 and 74 is also large sufficiently, and the tongue plate 17 is readily inserted through between them.

Subsequently, the retractor side of the shoulder belt section 16b is pulled to tense the portion of the shoulder belt section 16b nearer to the tongue plate 17 and the lap belt section 16a. Under that condition, the levers 75 are rotated in the clockwise direction in FIG. 14A. As a result, following to the levers 75, the clasping member 77 is urged toward the clasping member 74 while tightening the seat belt 16, and pushes the clasping member 74 to the right in FIG. 14B via the seat belt 16. Therefore, the distance between the clasping members 74 and 72 decreases, and the seat belt 16 is locked by the clasping members 72, 74 and 77, and prevented from moving in its lengthwise direction.

Figure 15A:
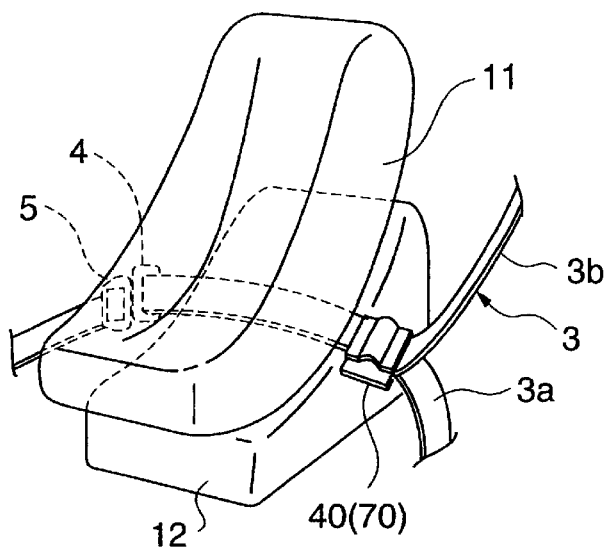
FIGS. 15A and 15B are diagrams that shows belt locking apparatuses according to the present invention attached in other positions.
Figure 15B:
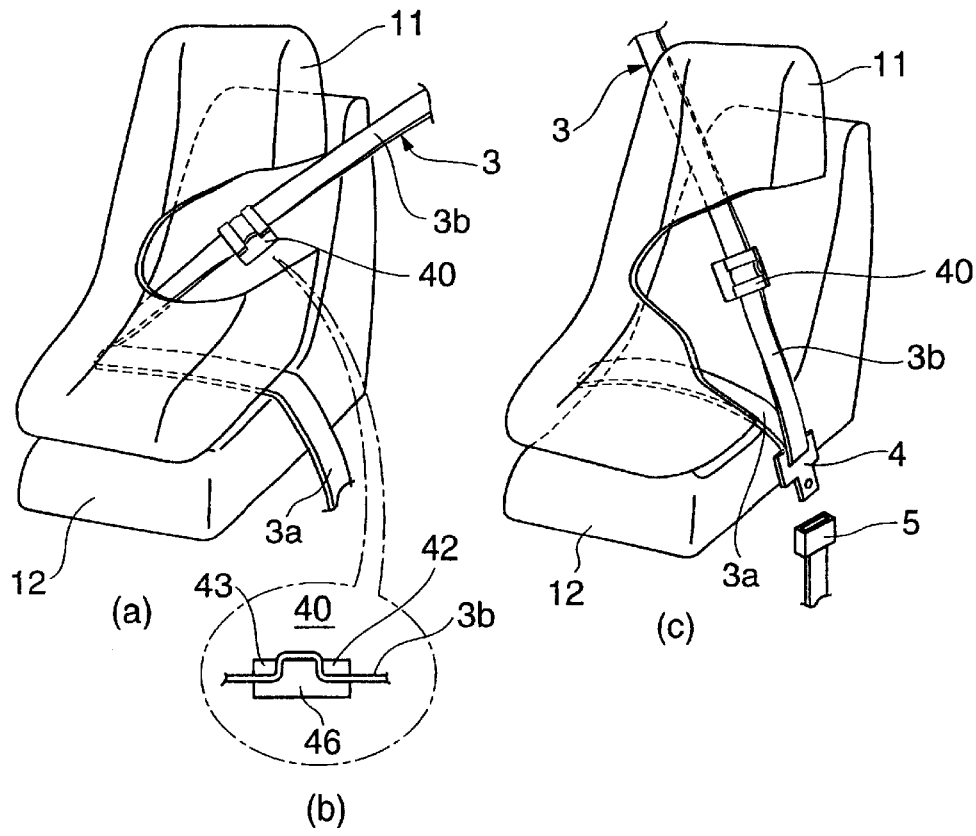
Figure 16:
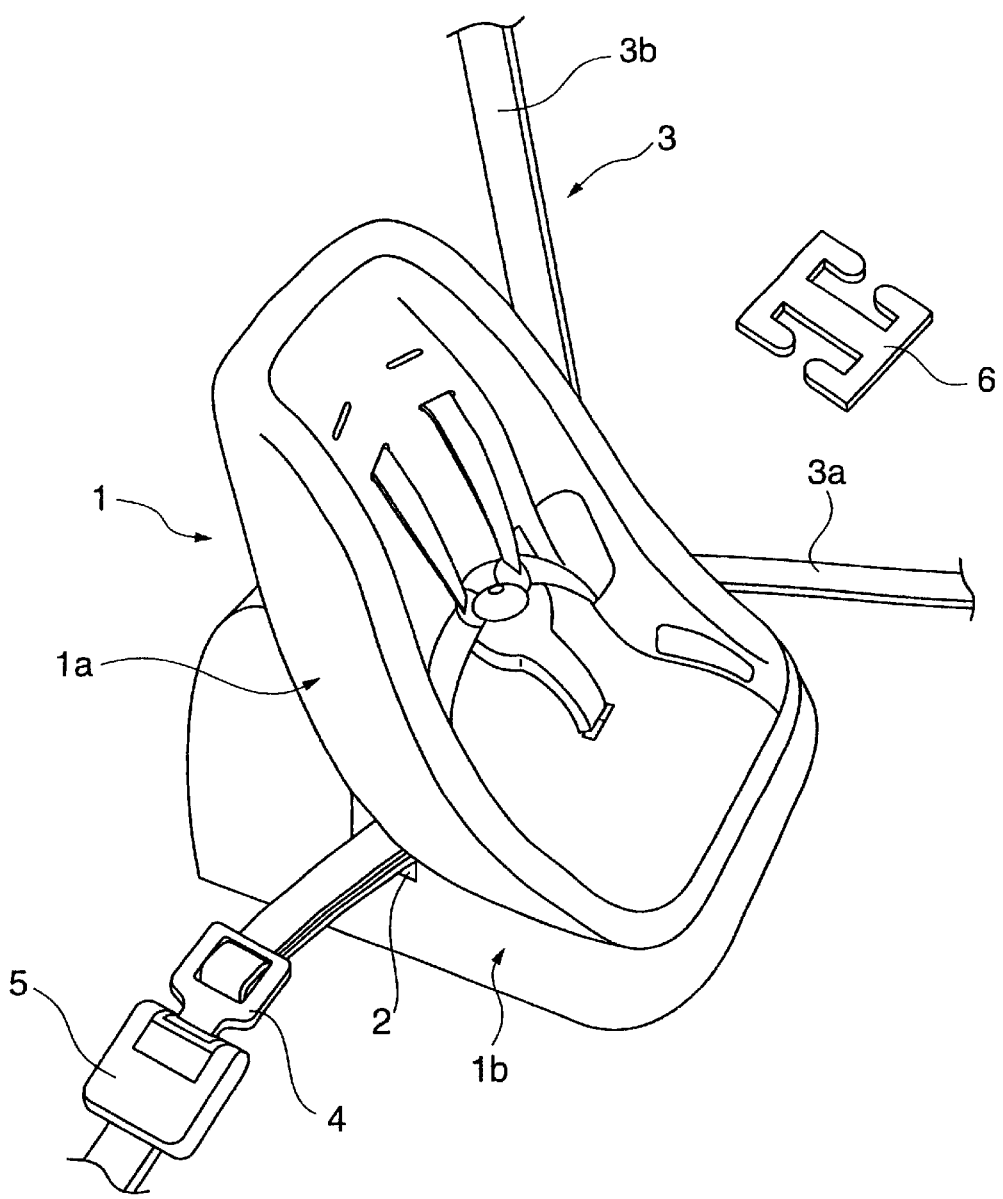
FIG. 16 is a schematic perspective view that shows a child car seat having a conventionally employed clip.
Figure 17:
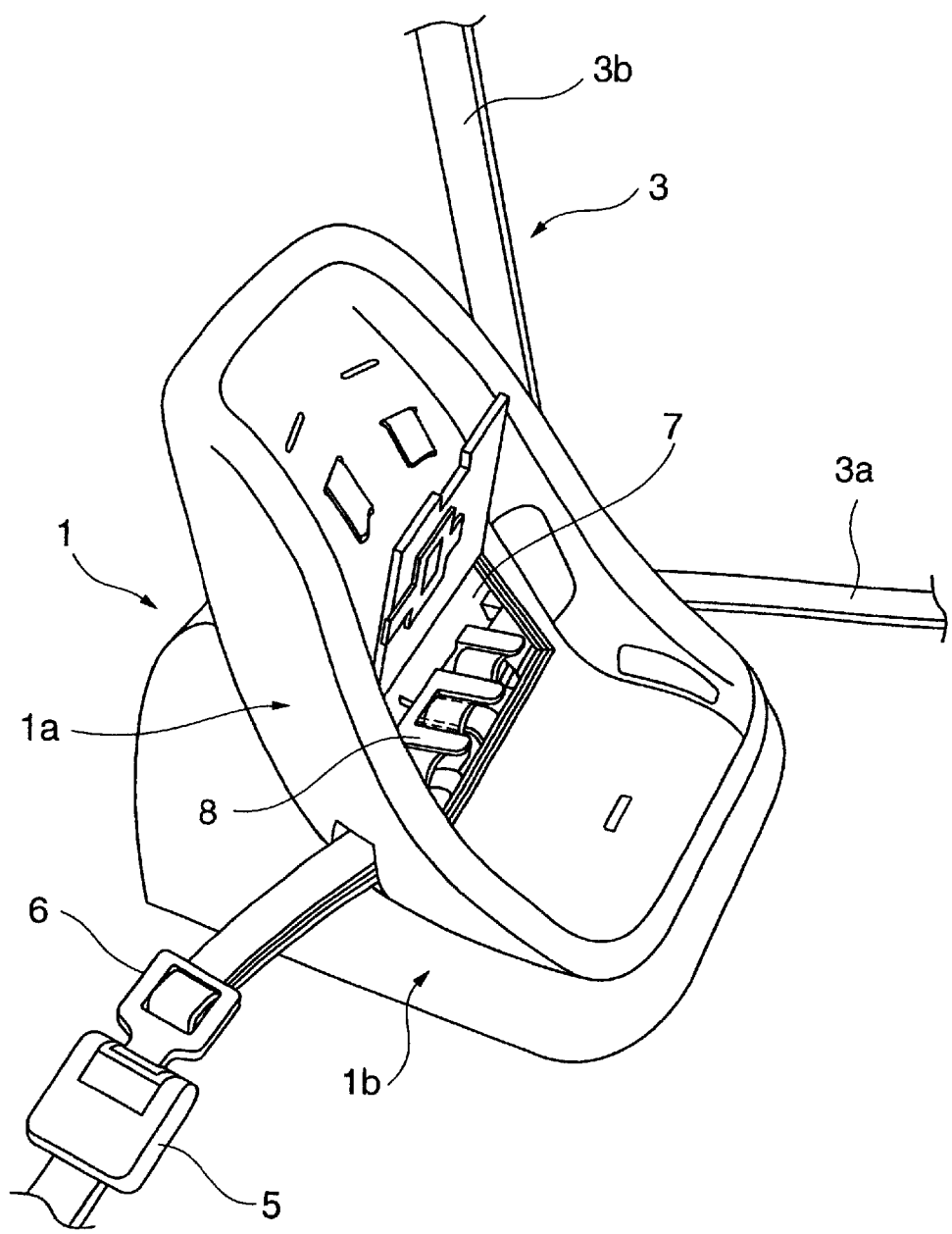
FIG. 17 is a perspective view that shows a child car seat that is previously proposed by the applicant.

Heretofore, the belt locking apparatuses 40 and 70 have been explained as being provided in the belt insertion opening 13 defined between the seat body 11 and the support 12 of the child car seat 10 as shown in FIG. 1. However, locations of the belt locking apparatuses 40 and 70 are not limited to those positions. FIGS. 15A and 15B are diagrams that show examples using a belt locking apparatus attached in other positions.

FIG. 15A shows an example using the belt locking apparatus 40 and 70 as a clip easily handled to fasten a seat belt, and it is of a type fixing a three-point belt at two points. That is, in FIG. 15A, after the tongue plate 4 is connected to the buckle 5 on the part of the passenger seat, the retractor side of the shoulder belt section 3b of the seat belt 3 is drawn to pull the lap belt section 3a, and after the support 12 of the child car seat is firmly fixed on a passenger seat of a vehicle, it is used to clip the overlapping portion of the shoulder belt section 3b and the lap belt section 3a. In this case, the belt locking apparatus 40 and 70 may be used as a separate member independent from the child car seat. However, it is recommended to hold it attached at a predetermined position on a side surface of the support 12 of the child car seat to prevent the effort of finding it for use or prevent it from being lost. It is also recommended to hold the belt locking apparatus 40 and 70 attached at opposite sides of the support 12 such that the child car seat can be fixed at any of the right and left side on a passenger seat of a vehicle.

Even when the belt locking apparatuses 40 and 70 are fixed on the same position of the support 12, it is also possible to rigidly fix the support 12 alone or rigidly fix the child car seat body 11 as well as the support 12, depending upon the type of the child car seat.

FIG. 15B shows an example that attaches one of the belt locking apparatuses 40 and 70, in particular, the belt locking apparatus 40, to a different position of the child car sheet. It is of a type fixing only the shoulder belt section alone. In FIG. 15B(*a*) after the tongue plate is connected to a buckle of a passenger seat, the shoulder belt section 3*b* of the seat belt 3 is drawn toward the retractor side to pull the lap belt section 3*a*. Under the condition where the support 12 of the child car seat is firmly fixed on a passenger seat, the shoulder belt section 3*b* is pulled out and turned around the child car seat body 11 to behind the back surface without being stacked on the lap belt section 3*a*, and only the shoulder belt section 3*b* is fixed by the belt locking apparatus 40 attached to an upper portion of the support 12 (in this case, the support 12 is required to be high) (see FIG. 14B(*b*)). In this manner, the seat belt 3 is maintained in a tensile condition throughout its length from the shoulder belt section 3*b* fixed by the belt locking apparatus 40 to the entirety of the lap belt section 3*a*, and the child car seat is reliably fixed on the passenger seat.

It is preferred to attach two belt locking apparatuses 40 at two upper positions of the support 12 such that the child car seat can be fixed in any of the right and left side of the passenger seat.

As an improvement thereof, only one belt locking apparatus 40 may be provided at an upper central position of the support 12 as shown in FIG. 15B(*a*) such that it is used by fixing it after changing its orientation as shown in FIG. 15B(*c*), if necessary.

What is claimed is:

1. A child car seat to be fixed on a passenger seat of a vehicle with a seat belt of the vehicle, comprising:
    a support being set on the passenger seat of the vehicle;
    a seat body supported on said support; and
    a belt locking apparatus that clamps the seat belt of the vehicle to fix said support on the passenger seat of the vehicle, said belt locking apparatus including a base and a locking mechanism, the base including a base body on which a lap belt section of the seat belt is placed and an intermediate member on which a shoulder belt section of the seat belt is placed, the lap belt section being held in place by the base body and the intermediate member, the shoulder belt section being held in place by the locking mechanism and the intermediate member and the locking mechanism reclining on the shoulder belt section of the seat belt and clamping the seat belt when closed relative to said base.

2. A child car seat according to claim 1, wherein said locking mechanism includes a lock arm disposed for rotation relative to said base to tightly clamp the seat belt between said base and said lock arm when said lock arm is closed relative to said base, thereby preventing a movement of the seat belt in a lengthwise direction thereof.

3. A child car seat to be fixed on a passenger seat of a vehicle with a seat belt of the vehicle, comprising:
    a support being set on the passenger seat of the vehicle;
    a seat body supported on said support; and
    a belt locking apparatus that clamps the seat belt of the vehicle to fix said support on the passenger seat of the vehicle, said belt locking apparatus including a base and a locking mechanism, the base including a base body on which a lap belt section of the seat belt is placed and an intermediate member on which a shoulder belt section of the seat belt is placed, the locking mechanism reclining on the shoulder belt section of the seat belt and clamping the seat belt when closed relative to said base,
    wherein said lock locking mechanism includes a lock arm disposed for rotation relative to said base to tightly clamp the seat belt between said base and said lock arm when said lock arm is closed relative to said base, thereby preventing a movement of the seat belt in a lengthwise direction thereof, and
    wherein said belt locking apparatus further includes a cam disposed on the intermediate member for rotation in one direction to prevent a releasing movement of the seat belt while permitting a fastening movement of the seat belt when said lock arm is closed relative to said base.

4. A child car seat according to claim 3, wherein said cam has a cam surface including depressions or projections which increase a frictional resistance to the seat belt.

5. A child car seat according to claim 3, wherein said belt locking apparatus further includes a ridge formed on the intermediate member to project near said cam within an area for receiving the seat belt when said lock arm is closed.

6. A belt locking apparatus used in a child car seat to be fixed on a passenger seat of a vehicle with a seat belt of the vehicle, comprising:
    a base having a base body on which a lap belt section of the seat belt is placed and an intermediate member on which a shoulder belt section of the seat belt is placed; and
    a locking mechanism reclining on the shoulder belt section of the seat belt and clamping the seat belt when closed relative to said base, the lap belt section being held in place by the base body and the intermediate member, and the shoulder belt section being held in place by the locking mechanism and the intermediate member.

7. A belt locking apparatus according to claim 6, wherein said locking mechanism includes a lock arm disposed for rotation relative to said base to clamp the seat belt between said base and said lock arm when said lock arm is closed relative to said base, thereby preventing a movement of the seat belt in a lengthwise direction thereof.

8. A belt locking apparatus used in a child car seat to be fixed on a passenger seat of a vehicle with a seat belt of the vehicle, comprising:
    a base having a base body on which a lap belt section of the seat belt is placed and an intermediate member on which a shoulder belt section of the seat belt is placed;
    a locking mechanism reclining on the shoulder belt section of the seat belt and clamping the seat belt when closed relative to said base, wherein said lock locking mechanism includes a lock arm disposed for rotation relative to said base to clamp the seat belt between said base and said lock arm when said lock arm is closed relative to said base. thereby preventing a movement of the seat belt in a lengthwise direction thereof; and
    a cam disposed on the intermediate member for rotation in one direction to prevent a releasing movement of the seat belt while permitting a fastening movement of the seat belt when said lock arm is closed relative to said base.

9. A belt locking apparatus according to claim 8, wherein said cam has a cam surface including depressions or projections which increase a frictional resistance to the seat belt.

10. A belt locking apparatus according to claim 8, further comprising a ridge formed on the intermediate member to project near said cam within an area for receiving the seat belt when said lock arm is closed.

11. A child car seat to be fixed on a passenger seat of a vehicle with a seat belt of the vehicle, comprising:

a support being set on the passenger seat of the vehicle;

a seat body supported on said support; and a belt locking apparatus that clamps the seat belt of the vehicle to fix said support on the passenger seat of the vehicle, said belt locking apparatus including a base and a locking mechanism, the base including a base body on which a lap belt section of the seat belt is placed and an intermediate member on which a shoulder belt section of the seat belt is placed, the locking mechanism reclining on the shoulder belt section of the seat belt and clamping the seat belt when closed relative to said base, wherein said lock locking mechanism includes a lock arm disposed for rotation relative to said base to tightly clamp the seat belt between said base and said lock arm when said lock arm is closed relative to said base, thereby preventing a movement of the seat belt in a lengthwise direction thereof, and wherein the base body is fixed to the support, and the intermediate member and the lock arm are pivotably supported by a pin at one end of the base body.

12. A child car seat according to claim 11, wherein the base body supports a latch member pivotably supported at another end of the base body.

13. A child car seat according to claim 11, wherein the lock arm includes a claw which engages with an engagement hole of the latch member.

14. A belt locking apparatus used in a child car seat to be fixed on a passenger seat of a vehicle with a seat belt of the vehicle, comprising:

a base having a base body on which a lap belt section of the seat belt is placed and an intermediate member on which a shoulder belt section of the seat belt is placed; and a locking mechanism reclining on the shoulder belt section of the seat belt and clamping the seat belt when closed relative to said base, wherein said locking mechanism includes a lock arm disposed for rotation relative to said base to clamp the seat beat between said base and said lock arm when said lock arm is closed relative to said base, thereby preventing a movement of the seat belt in a lengthwise direction thereof, and wherein the base body is fixed to the support, and the intermediate member and the lock arm are pivotably supported by a pin at one end of the base body.

15. The belt locking apparatus according to claim 14, wherein the base body supports a latch member pivotably supported at another end of the base body.

16. The belt locking apparatus according to claim 15, wherein the lock arm includes a claw which engages with an engagement hole of the latch member.

17. The belt locking apparatus according to claim 14, wherein the child car seat further comprises:

a support being set on the passenger seat of the vehicle, wherein the base body is fixed to the support.

* * * * *